Aug. 16, 1932. M. CASTRO 1,871,495
CARGO HANDLING APPARATUS FOR AIRCRAFT AND THE LIKE
Filed June 13, 1930 2 Sheets-Sheet 2
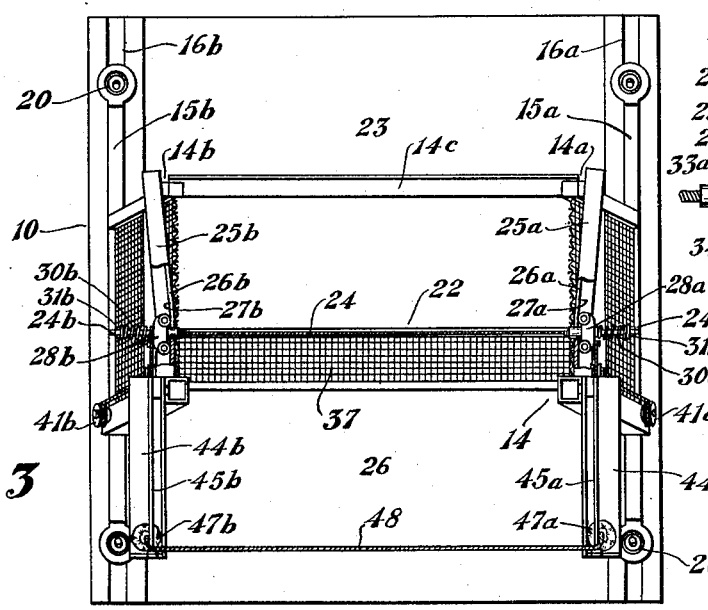
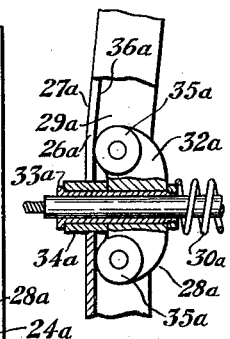
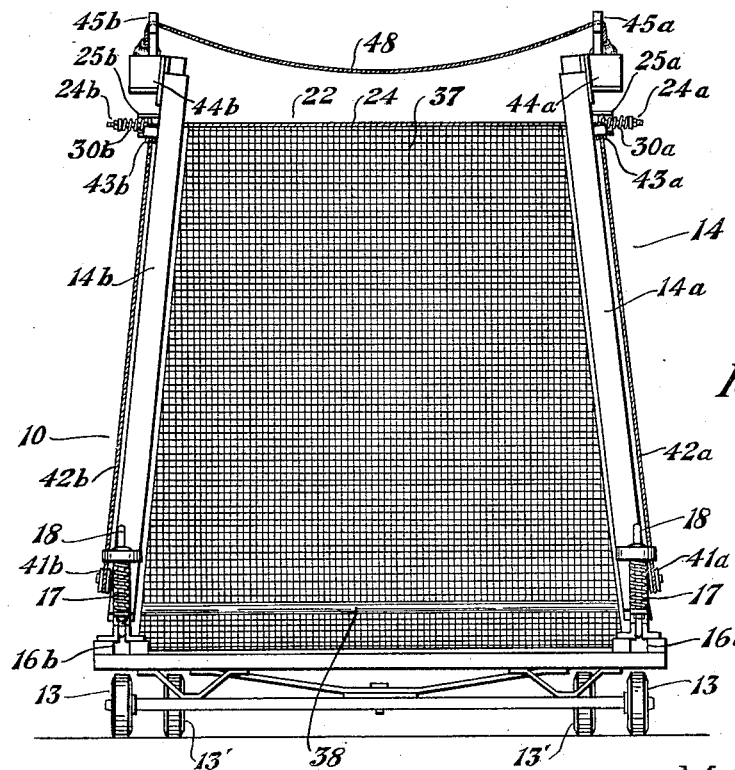
Inventor
M. Castro
By Frease and Bishop
Attorneys Patented Aug. 16, 1932

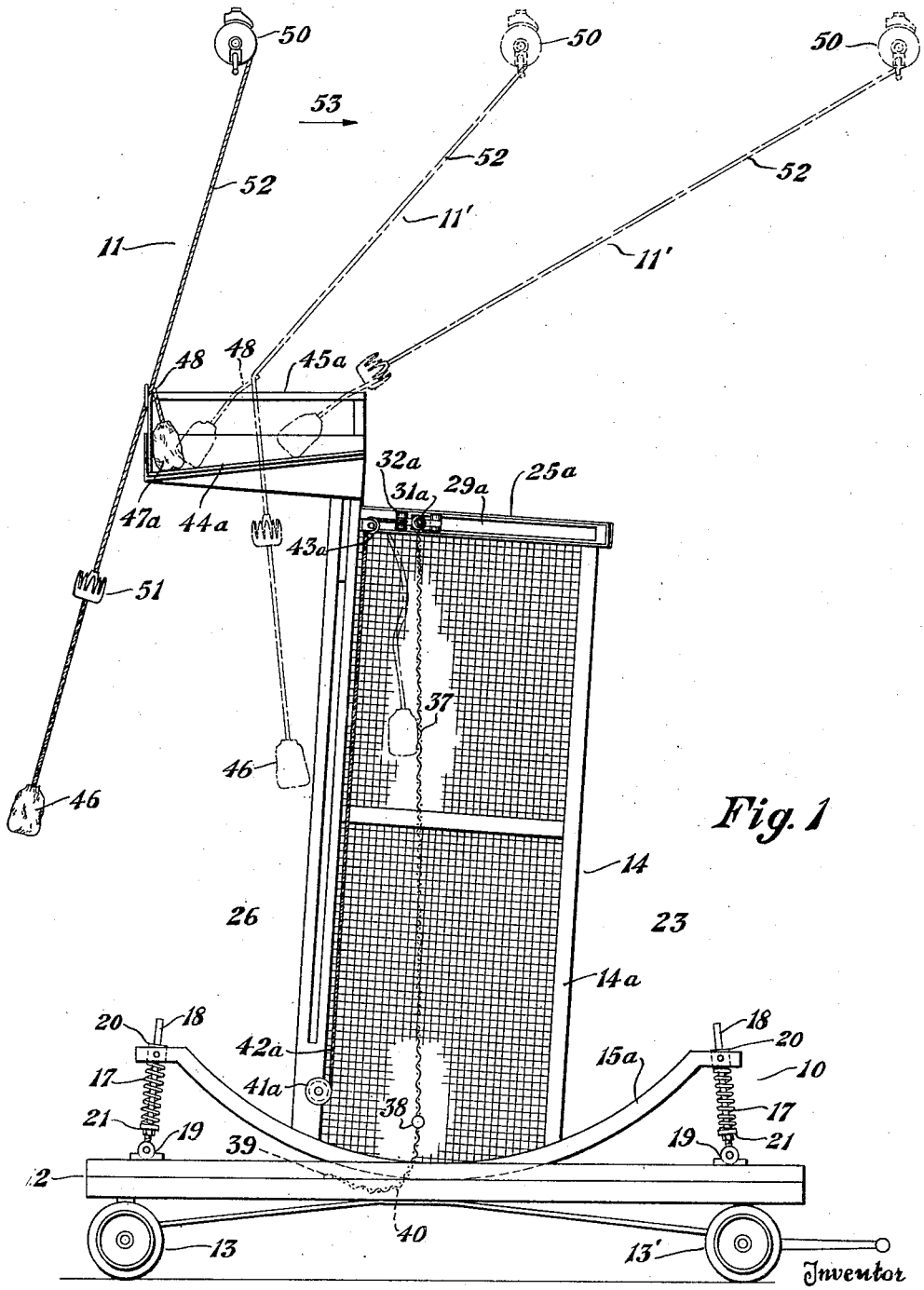

1,871,495

UNITED STATES PATENT OFFICE

MANUEL CASTRO, OF CANTON, OHIO

CARGO HANDLING APPARATUS FOR AIRCRAFT AND THE LIKE

Application filed June 13, 1930. Serial No. 460,945.

My invention relates to apparatus for picking up and discharging cargo from aircraft in flight, and includes improvements in the apparatus set forth in my prior application for Letters Patent of the United States for cargo handling apparatus for aircraft and the like, Serial No. 309,881, filed October 2, 1928.

Such apparatus necessarily includes elements operatively mounted on the ground or on a ground structure, or on a ship, hereinafter termed the ground elements, for positioning the cargo to be picked up and for receiving the cargo to be discharged, and also includes elements operatively mounted on the aircraft, hereinafter termed the aircraft elements, for cooperating with the ground elements in picking up and discharging cargo.

The present improvements relate more particularly to the ground elements, and are directed towards improving their structure, operation, and cooperation with the aircraft elements.

A fundamental requirement for the successful operation of such apparatus, is to impart to the cargo to be picked up from rest, the required acceleration so that it will attain the velocity or flying speed of the aircraft without reducing the flying speed of the aircraft to any considerable extent.

For example it is estimated that for an aircraft of 2,000 pounds gross load (total weight lifted), and with sufficient excess power to climb 300 ft./min., there is available sufficient excess thrust to provide a force of approximately 97.5 lbs. at 70 M. P. H. flying speed, for use in imparting to the cargo being picked up from rest the necessary acceleration so that it will attain the desired velocity.

Under these circumstances the distance required to be covered by the cargo from the instant it is connected with the pick up means until it attains the speed of the aircraft is as follows:

Feet
For 50 lbs. cargo, distance 84.3
For 40 lbs. cargo, distance 67.5
For 30 lbs. cargo, distance 50.6
For 20 lbs. cargo, distance 33.7
For 10 lbs. cargo, distance 16.9

In other words, it is necessary for the successful operation of such apparatus that the pick up means be secured to a cable which is permitted an extension of 84.3, 67.5, 50.6, 33.7, or 16.9 feet according to the load to be picked up, as aforesaid.

The improved ground elements of the present invention are preferably used in combination with aircraft elements including automatic cargo pick up and discharge means, a cable at the lower end of which the cargo pick up and discharge means are secured, and yielding means mounted in the aircraft, preferably a yielding reel to which the upper end of the cable is connected for permitting the required extension of the cable for imparting the aforesaid acceleration to the cargo being picked up from rest.

The objects of the present invention include the provision of improved ground elements including yielding moving parts for cooperating with such aircraft elements and the like; whereby the operation of the ground elements during picking up and discharging of cargo is improved; whereby the ground elements are automatically and yieldingly maintained in the proper position for picking up and discharging cargo; and whereby the moving parts of the ground elements are automatically returned to their normal positions for picking up and/or discharging cargo after being moved during picking up and/or discharging cargo.

The foregoing and other objects are attained by the apparatus, parts, improvements and combinations, which comprise the present invention, and which are particularly and distinctly pointed out and set forth in the appended claims forming part hereof.

In general terms, the improved ground elements for cargo handling apparatus for aircraft and the like, include a base, a frame extending upwardly from the base and mounted for movement thereon, means at the upper end of the frame for positioning cargo to be picked up, and means on the frame for receiving discharged cargo, means for yieldingly resisting movement of the frame, the cargo receiving means being yieldingly movable with respect to the frame, and means normally maintaining the cargo receiving means in a predetermined position, all the parts of the ground elements being associated with each other for automatically assuming normal initial operative positions after a cycle of operating movements thereof.

A preferred embodiment of the invention is illustrated in the accompanying drawings forming part hereof, in which Figure 1 is a fragmentary side elevation of ground elements for cargo handling apparatus for aircraft and the like, including the present improvements, cooperation thereof with the preferred aircraft elements being illustrated diagrammatically;

Fig. 2, a front elevation thereof;

Fig. 3, a top plan view thereof with portions broken away; and

Fig. 4, an enlarged fragmentary view thereof, similar to Fig. 3.

Similar numerals refer to similar parts throughout the drawings.

The improved ground elements for cargo handling apparatus for aircraft and the like, are indicated generally at 10, and are adapted for cooperation with aircraft elements indicated diagrammatically at 11.

The ground elements 10 preferably include a base 12, and the base 12 is preferably carried upon sets of wheels 13 and 13′, whereby the ground elements may be rolled to any desired location on the landing surface of an air port or the like.

A frame 14 extends upwardly from the base 12, and is mounted for a rotary and preferably rocking movement thereon, as by means of rockers 15a and 15b secured respectively at the lower ends of the sides 14a and 14b of the frame, and rocking respectively in groove tracks 16a and 16b formed in the upper surface of the base 12.

Yielding means are preferably provided for resisting rotary rocking movement of the frame on the base, and may include a compression spring 17 interposed between the base 12 and each extremity of each rocker, and each compression spring is provided with suitable guide means which may include a guide rod 18 pivotally secured at its lower end to a bearing block 19 on the base and slidably extending through the compression spring 17 and the slide aperture of a slide bearing 20 pivotally secured at the extremity of a rocker above the particular bearing block 19.

An adjustable screw spring stop 21 is preferably provided at the lower end of each guide rod 18, and each compression spring thus reacts between a slide bearing 20 and a stop 21.

Accordingly by suitably adjusting the screw stops 21, the rockers may be normally and yieldingly maintained so that the frame 14 extends upwardly from the base at the desired angular position with respect to the base, depending on operating conditions, such as the weight of the cargoes to be picked up and/or discharge, wind conditions, and the like.

The frame 14 includes the side members 14a and 14b which preferably extend upwardly and towards each other, and between which cargo receiving means indicated generally at 22 are operatively mounted, preferably for movement with respect to the frame, and the frame 14 may also include one or more braces 14c extending between the side members on the off-side 23 of the cargo receiving means 22.

The cargo receiving means 22 preferably include a horizontal cable 24 extending laterally between upper rails 25a and 25b of the side members 14a and 14b, respectively.

The rails 25a and 25b extend longitudinally from the on-side 26 of the cargo receiving means 22 to the off-side 23 thereof and the end 24a of the cable 24 extends through a slot 26a formed in a preferably vertical and longitudinally extending wall 27a of the rail 25a; while the end 24b of the cable 24 extends through a slot 26b formed in a preferably vertical and longitudinally extending wall 27b of the rail 25b.

A roller carriage 28a rolls longitudinally in an outwardly opening longitudinally extending trough 29a formed in the outer side of the rail 25a; and the end 24a of the cable is yieldingly secured to the roller 28a as by means of a compression spring 30a reacting between the outer side of the carriage 28a and an adjustable nut 31a screwed on a suitably threaded rod secured at the extremity of the outer end 24a of the cable 22.

Similarly, a roller carriage 28b rolls longitudinally in an outwardly opening longitudinally extending trough 29b formed in the outer side of the rail 25b; and the end 24b of the cable is yieldingly secured to the roller 28b as by means of a compression spring 30b reacting between the outer side of the carriage 28b and an adjustable nut 31b screwed on a suitably threaded rod secured at the extremity of the outer end 24b of the cable 22.

Each of the roller carriages 28a and 28b are similarly constructed, and the carriage 28a is illustrated in the enlarged view of Fig. 4, and will be described in detail.

The carriage 28a includes a longitudinally extending frame 32a midway between the ends of which a laterally extending sleeve 33a is mounted in a laterally extending bore formed in the frame 32a.

On the inner side of the frame 32a a roller 34a is mounted on the sleeve 33a for rotation about a preferably horizontal axis thereon and between the upper and lower preferably parallel longitudinally extending faces of the slot 26a.

At each end of the carriage 32a a set of rollers 35a are operatively mounted for rotation about a vertical axis, and for rolling against the base 36a of the trough 29a.

The cargo receiving means 22 further includes a flexible sheet member 37 secured at its upper end and supported by the horizontal cable 24 and depending downwardly therefrom, and the sheet member 37 is preferably in the form, as illustrated, of a sheet of metallic fabric.

At the lower end of the flexible sheet member 37 an axially horizontal weight bar 38 is secured, and the flexible sheet 37 extends below the bar 38 and is curved towards the on-side 26 of the cargo receiving means, and the lower end of the flexible sheet 37 is secured to the base 12 as at 39, whereby an upwardly opening laterally extending cargo receiving pocket 40 is formed below the weight bar 38.

Means are provided for normally maintaining the cable 24 at the on-side end of the rail slots, and may include retrieving reels 41a and 41b mounted respectively on the side members 14a and 14b to which the lower ends of cables 42a and 42b are connected respectively and the cables 42a and 42b extend respectively about pulleys 43a and 43b mounted at the upper ends of the side members 14a and 14b, and the upper outer ends of the cables 42a and 42b are secured respectively to the on-side of the carriages 28a and 28b, whereby the retrieving reels 41a and 41b through their connection by the cables 42a and 42b with the roller carriages 28a and 28b normally maintain the roller carriages 28a and 28b and the cargo receiving means 22 movably carried thereby at the position for receiving cargo illustrated in the drawings.

Cargo positioning means are carried at the upper end of the frame 14 and preferably include a platform 44a secured at the upper end of the frame side member 14a, and a platform 44b secured at the upper end of the frame side member 14b.

The platforms 44a and 44b preferably extend longitudinally towards the on-side of the cargo receiving flexible sheet 37.

An upwardly and longitudinally extending guide frame 45a is mounted in the inside of the platform 44a and a similar guide frame 45b is mounted in the inside of the platform 44b.

The rails 25a and 25b preferably flare outwardly from the on-side ends thereof whereby when the sheet 37 and cable 24 are moved in the off-side direction by reason of the impact of a discharged cargo bag 46, the outward flaring of the rails will load the springs 30a and 30b and this loading of the springs will tend to return the carriages 28a and 28b to their normal position for receiving cargo.

The cargo to be picked up is preferably carried in bags 47a and 47b supported on the platforms 44a and 44b, respectively, and connected with each other by a cable 48, whose ends are connected to the bags 47a and 47b and which lays over the upper sides of the guide frames 45a and 45b and extends laterally in front of and spaced from the on-side of the cargo receiving means 22.

The aircraft elements indicated diagrammatically at 11 are similar to those set forth in my prior application for Letters Patent of the United States for cargo handling apparatus for aircraft and the like, Serial No. 309,881, filed October 2, 1928, and include a reel 50 suitably mounted in an aircraft fuselage not shown and a combined pick up and discharging means 51 connected with the reel 50 by means of a cable 52.

The reel 50 includes means applying a suitable yielding unwinding reaction so that the necessary acceleration may be imparted to the cargo being picked up by the pick up means 51.

The pick up means 51 is automatically actuated by impact either with the cable 48 connecting the cargo bags 47a and 47b, or against the flexible sheet 37, when cargo is not being picked up.

The aircraft elements are illustrated in full lines in Fig. 1 just as the cable 52 strikes the cable 48 when moving in the horizontal direction of the arrow 53.

The aircraft elements are illustrated in dot-dash lines at 11' illustrating an intermediate position of the cable 52 as its lower end whips about the cable 48 before the cargo bag 46 has been released.

At 11'' the aircraft elements are illustrated in dot-dash lines after the cable 48 and attached cargo bags 47a and 47b have been picked up and engaged by the pick up and discharge means 51 and just as the discharged cargo bag 46 is striking the flexible sheet 37.

The impact of the bag 46 with the flexible sheet 37 moves the cargo receiving means 22 in the off-side direction against the yielding resistances of the retrieving reel 41a and the springs 30a and 30b.

If the horizontal velocity of the discharged bag 46 is great enough to move the carriages 28a and 28b to their extreme positions at the off-side ends of their rails, the whole frame 14 will rock or roll bodily in the off-side direction.

In any event the discharged bag 46 drops into the pocket 40 and all the several moving parts of the ground elements 10 resume their normal positions for receiving cargo as illustrated in full lines in the drawings.

I claim:

1. Ground elements for cargo handling apparatus for aircraft and the like, including a base, a frame extending upwardly from the base and mounted for rocking movement thereon, means at the upper end of the frame for positioning cargo to be picked up, and means on the frame for receiving discharged cargo.

2. Ground elements for cargo handling apparatus for aircraft and the like, including a base, a frame extending upwardly from the base and mounted for rocking movement thereon, means at the upper end of the frame for positioning cargo to be picked up, means on the frame for receiving discharged cargo, and means for yieldingly resisting movement of the frame.

3. Ground elements for cargo handling apparatus for aircraft and the like, including a base, a frame extending upwardly from the base and mounted for rocking movement thereon, means at the upper end of the frame for positioning cargo to be picked up, and means on the frame and movable with respect to the frame for receiving discharged cargo.

4. Ground elements for cargo handling apparatus for aircraft and the like, including a base, a frame extending upwardly from the base and mounted for rocking movement thereon, means at the upper end of the frame for positioning cargo to be picked up, means on the frame and movable with respect to the frame for receiving discharged cargo, and means for yieldingly resisting movement of the frame.

5. Ground elements for cargo handling apparatus for aircraft and the like, including a base, a frame extending upwardly from the base and mounted for movement thereon, means at the upper end of the frame for positioning cargo to be picked up, and resilient means on the frame for receiving discharged cargo.

6. Ground elements for cargo handling apparatus for aircraft and the like, including a base, a frame extending upwardly from the base and mounted for movement thereon, means at the upper end of the frame for positioning cargo to be picked up, resilient means on the frame for receiving discharged cargo, and means for yieldingly resisting movement of the frame.

7. Ground elements for cargo handling apparatus for aircraft and the like, including a base, a frame extending upwardly from the base and mounted for movement thereon, means at the upper end of the frame for positioning cargo to be picked up, and resilient means on the frame and movable with respect to the frame for receiving discharged cargo.

8. Ground elements for cargo handling apparatus for aircraft and the like, including a base, a frame extending upwardly from the base and mounted for movement thereon, means at the upper end of the frame for positioning cargo to be picked up, resilient means on the frame and movable with respect to the frame for receiving discharged cargo, and means for yieldingly resisting movement of the frame.

9. Ground elements for cargo handling apparatus for aircraft and the like, including a base, a frame extending upwardly from the base, and the frame being mounted at its lower end for rocking movement on the base, means at the upper end of the frame for positioning cargo to be picked up, and means on the frame for receiving discharged cargo.

10. Ground elements for cargo handling apparatus for aircraft and the like, including a base, a frame extending upwardly from the base, and the frame being mounted at its lower end for movement on the base, means at the upper end of the frame for positioning cargo to be picked up, means on the frame for receiving discharged cargo, and means for yieldingly resisting movement of the frame.

11. Ground elements for cargo handling apparatus for aircraft and the like, including a base, a frame extending upwardly from the base and mounted for rocking movement thereon, means at the upper end of the frame for positioning cargo to be picked up, means on the frame for receiving discharged cargo and means for yieldingly resisting movement of the frame.

12. Ground elements for cargo handling apparatus for aircraft and the like, including a base, a frame extending upwardly from the base and mounted for movement thereon about a horizontal axis, means at the upper end of the frame for positioning cargo to be picked up, means on the frame for receiving discharged cargo, and means for yieldingly resisting movement of the frame.

13. Ground elements for cargo handling apparatus for aircraft and the like, including a base, a frame extending upwardly from the base and mounted for movement thereon, means at the upper end of the frame for positioning cargo to be picked up, and means mounted for rolling movement on the frame for receiving discharged cargo.

14. Ground elements for cargo handling apparatus for aircraft and the like, including a base, a frame extending upwardly from the base and mounted for movement thereon, means at the upper end of the frame for positioning cargo to be picked up, means mounted for rolling movement on the frame for receiving discharged cargo, and means for yieldingly resisting movement of the frame.

15. Ground elements for cargo handling apparatus for aircraft and the like, including a base, a frame extending upwardly from the base and mounted for rocking movement thereon about a horizontal axis, means at the upper end of the frame for positioning cargo to be picked up, and means mounted for rolling movement on the frame for receiving discharged cargo.

16. Ground elements for cargo handling apparatus for aircraft and the like, including a base, a frame extending upwardly from the base and mounted for rocking movement thereon, means at the upper end of the frame for positioning cargo to be picked up, means on the frame and movable with respect to the frame for receiving discharged cargo, and means normally maintaining the cargo receiving means in a predetermined position.

17. Ground elements for cargo handling apparatus for aircraft and the like, including a base, a frame extending upwardly from the base and mounted for movement thereon, means at the upper end of the frame for positioning cargo to be picked up, means on the frame and movable with respect to the frame for receiving discharged cargo, means for yieldingly resisting movement of the frame, and means normally maintaining the cargo receiving means in a predetermined position.

18. Ground elements for cargo handling apparatus for aircraft and the like, including a base, a frame extending upwardly from the base and mounted for movement thereon, means at the upper end of the frame for positioning cargo to be picked up, means mounted for rolling movement on the frame for receiving discharged cargo, and means normally maintaining the cargo receiving means in a predetermined position.

19. Ground elements for cargo handling apparatus for aircraft and the like, including a base, a frame extending upwardly from the base and mounted for movement thereon, means at the upper end of the frame for positioning cargo to be picked up, means mounted for rolling movement on the frame for receiving discharged cargo, means for yieldingly resisting movement of the frame, and means normally maintaining the cargo receiving means in a predetermined position.

20. Ground elements for cargo handling apparatus for aircraft and the like, including a base, a frame extending upwardly from the base and mounted for movement thereon about a horizontal axis, means at the upper end of the frame for positioning cargo to be picked up, means mounted for rolling movement on the frame for receiving discharged cargo, and means normally maintaining the cargo receiving means in a predetermined position.

21. Cargo receiving means for cargo handling apparatus for aircraft and the like, including a frame, a carriage mounted for rolling longitudinally on the frame, and an impact member supported by the carriage.

22. Cargo receiving means for cargo handling apparatus for aircraft and the like, including a frame, a pair of carriages mounted for rolling longitudinally on the frame, and an impact member secured to the carriages.

23. Cargo receiving means for cargo handling apparatus for aircraft and the like, including a frame, a pair of carriages mounted for rolling longitudinally on the frame, and an impact member yieldingly secured to the carriages.

24. Cargo receiving means for cargo handling apparatus for aircraft and the like, including a frame, a pair of laterally spaced carriages mounted for rolling longitudinally on the frame, a laterally extending cable connected at each end with one of the carriages, and an impact member supported by the cable.

25. Cargo receiving means for cargo handling apparatus for aircraft and the like, including a frame, a pair of laterally spaced carriages mounted for rolling longitudinally on the frame, a laterally extending cable yieldingly connected at each end with one of the carriages, and an impact member supported by the cable.

26. Cargo receiving means for cargo handling apparatus for aircraft and the like, including a frame, a pair of laterally spaced carriages mounted for rolling longitudinally and angularly to each other on the frame, a laterally extending cable yieldingly connected at each end with one of the carriages, and an impact member supported by the cable.

27. Cargo receiving means for cargo handling apparatus for aircraft and the like, including a frame, a pair of laterally spaced rails mounted on the frame, the rails extending longitudinally and angularly with respect to each other, a carriage mounted on each rail for longitudinal movement thereon, and a laterally extending cable yieldingly connected at each end with one of the carriages.

28. Cargo receiving means for cargo handling apparatus for aircraft and the like, including a frame, a pair of laterally spaced rails mounted on the frame, the rails extending longitudinally and angularly with respect to each other, a carriage mounted on each rail for longitudinal movement thereon, a laterally extending cable yieldingly connected at each end with one of the carriages, and an impact member supported by the cable.

29. Ground elements for cargo handling apparatus for aircraft and the like including a base, rocking means operatively mounted for rocking on the base, a frame extending upwardly from the rocking means, means on the frame for receiving discharged cargo, and yielding means connecting the base and the rocking means for yieldingly resisting movement of the rocking means on the frame.

In testimony that I claim the above, I have hereunto subscribed my name.

MANUEL CASTRO.